(12) United States Patent
Kirkman et al.

(10) Patent No.: US 11,408,621 B2
(45) Date of Patent: Aug. 9, 2022

(54) SYSTEMS AND METHODS FOR CONTROLLING FREE COOLING AND INTEGRATED FREE COOLING

(71) Applicant: TRANE INTERNATIONAL INC., Davidson, NC (US)

(72) Inventors: Brian A. Kirkman, Shoreview, MN (US); Susanna Staubly Hanson, La Crosse, WI (US); Lee R. Cline, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 17/122,777

(22) Filed: Dec. 15, 2020

(65) Prior Publication Data

US 2022/0186944 A1 Jun. 16, 2022

(51) Int. Cl.
  *F25B 49/02* (2006.01)
  *F24F 3/06* (2006.01)
  *F24F 11/85* (2018.01)
  *F24F 11/65* (2018.01)

(52) U.S. Cl.
  CPC .............. *F24F 3/065* (2013.01); *F24F 11/65* (2018.01); *F24F 11/85* (2018.01); *F25B 49/022* (2013.01); *F25B 49/027* (2013.01); *F25B 2339/047* (2013.01); *Y02B 30/54* (2013.01)

(58) Field of Classification Search
  CPC ... F25B 49/027; F25B 2339/047; F24F 11/65; F24F 11/85; Y02B 30/54
  See application file for complete search history.

(56) References Cited

U.S. PATENT DOCUMENTS

| 8,583,289 B2 | 11/2013 | Stack et al. |
| 10,921,868 B2 | 2/2021 | Hay |
| 2004/0148950 A1* | 8/2004 | Catzel ............... F24F 3/08 62/180 |

(Continued)

FOREIGN PATENT DOCUMENTS

EP 351862 A1 7/2018

OTHER PUBLICATIONS

Extended European Search Report and Written Report, European Patent Application No. 21214878.7, dated May 13, 2022 (9 pages).

(Continued)

*Primary Examiner* — Jonathan Bradford
(74) *Attorney, Agent, or Firm* — Hamre, Shumann, Mueller & Larson, P.C.

(57) ABSTRACT

Chiller control systems and methods for chiller control use iterative modeling of cooling towers, heat exchangers, and pumps to determine the feasibility of integrated free cooling and the ability to take advantage of free cooling. The control systems and control methods can further include selecting the parameters for operating in the free cooling or integrated free cooling mode to improve efficiency and/or reduce energy consumption when operating in these modes. The models can have inputs and outputs that feed into one another, and converge at a solution over multiple iterations. The feasibility of integrated free cooling can be based on providing cooling to a cooling load process fluid at a heat exchanger. The availability of free cooling can be based on the cooling provided at the heat exchanger achieving a target temperature for the cooling load process fluid.

20 Claims, 5 Drawing Sheets

(56) References Cited

U.S. PATENT DOCUMENTS

| | | | |
|---|---|---|---|
| 2010/0307171 A1* | 12/2010 | Hamann | H05K 7/20745 62/77 |
| 2012/0103591 A1* | 5/2012 | Tozer | H05K 7/20836 165/281 |
| 2013/0027879 A1* | 1/2013 | Saal | H05K 7/20836 361/695 |
| 2017/0131004 A1 | 5/2017 | Kopko | |
| 2018/0120005 A1 | 5/2018 | Kopko et al. | |
| 2018/0209675 A1* | 7/2018 | Ridder | F24F 11/83 |

OTHER PUBLICATIONS

Fu Yangyang et al., "Equation-based object-oriented modeling and simulation of data center cooling systems", Energy and Buildings vol. 198, pp. 503-519 (2019).

* cited by examiner

SYSTEMS AND METHODS FOR CONTROLLING FREE COOLING AND INTEGRATED FREE COOLING

FIELD

This disclosure is directed to methods and control systems for determining an operating mode for a chiller system including a cooling tower and mechanical cooling.

BACKGROUND

In chilled water plants involving waterside economizing (free cooling), switchover modes between mechanical cooling, integrated free cooling, and free cooling are typically done based on a static outdoor air wet bulb temperature. Also, when in free cooling, tower water flows are typically held constant, but an optimization between tower fan power and pump power can be achieved.

SUMMARY

This disclosure is directed to methods and control systems for determining an operating mode for a chiller system including a cooling tower and mechanical cooling.

Chilled water plants can cool a process fluid such as water through methods such as mechanical cooling (i.e. using a vapor compression circuit to absorb heat from the process fluid), through free cooling using a cooling tower, or combinations of cooling methods. Some chilled water plants can include integrated free cooling where the cooling tower is used to supplement mechanical cooling to reduce the mechanical cooling load. Chilled water plants are dynamic systems, with variance in parameters such as change in temperature (delta-T), flow rates, changes in temperature over time, and the like. Using dynamic modeling instead of static values to determine switching of the chilled water plant across different modes (for example, free cooling using a cooling tower, integrated free cooling, and mechanical cooling, for example using a compression circuit) can realize improved performance and realize savings and efficiency opportunities.

In an embodiment, a chiller control system includes a controller. The controller is configured to receive one or more inputs for a cooling tower model including at least one dynamic cooling tower model input, receive one or more inputs for a heat exchanger model including at least one dynamic heat exchanger model input, and receive one or more inputs for a pump model including at least one dynamic pump model input. The controller is further configured to determine a cooling tower model output based on the cooling tower model and the at least one dynamic cooling tower model input, determine a heat exchanger model output based on the heat exchanger model and the at least one dynamic heat exchanger model input, and determine a pump model output based on the pump model and the at least one the pump model input. The controller is also configured to determine an operation of a chiller system, based on the cooling tower model output, the heat exchanger model output, and the pump model output. The operation of the chiller system is in a mode selected from the group consisting of a mechanical cooling mode, a free cooling mode, or an integrated free cooling mode. The controller is further configured to operate the chiller system in the determined operation.

In an embodiment, the chiller control system further includes a cooling tower temperature sensor configured to measure an outdoor wet bulb temperature and one or more heat exchanger temperature sensors, each of the one or more heat exchanger temperature sensors being located at an inlet and/or an outlet of a heat exchanger represented by the heat exchanger model.

In an embodiment, the controller is further configured to, when the operation of the chiller system is a free cooling mode, determine one or more free cooling parameters, the free cooling parameters including one or more of a condenser pump speed, a condenser pump flow rate, and a fan speed for the cooling tower. In an embodiment, the determination of the one or more free cooling parameters comprises incrementally adjusting at least one of the one or more free cooling parameters to an adjusted value, determining an energy consumption at the adjusted value, and wherein the one or more free cooling parameters are determined based on the energy consumption.

In an embodiment, the controller is configured to determine whether cooling is feasible. Determining of whether integrated free cooling is feasible includes determining a predicted heat exchanger leaving chilled water temperature when the cooling tower is operated at full capacity, comparing the predicted heat exchanger leaving chilled water temperature to a current chilled water return temperature, and determining that integrated free cooling is feasible when the predicted heat exchanger leaving chilled water temperature is lower than the current chilled water return temperature. In an embodiment, determining the predicted heat exchanger leaving chilled water temperature includes iteratively calculating the predicted heat exchanger leaving chilled water temperature and a cooling tower fluid temperature at an outlet of the heat exchanger, based on the cooling tower model and the heat exchanger model.

In an embodiment, the controller is configured to determine whether free cooling is available. The determining of whether free cooling is available includes determining a predicted heat exchanger leaving chilled water temperature that can be achieved by exchanging heat between a cooling tower circuit fluid and the chilled water, and comparing the predicted heat exchanger leaving chilled water temperature to a target temperature based on cooling demand. In an embodiment, the controller is configured to determine, when free cooling is available, a speed for a cooling tower fan and a speed for a cooling tower circuit pump based on predicted energy consumption by the cooling tower fan and the cooling tower circuit pump.

In an embodiment, a chiller system includes the chiller control system as described above, a refrigeration circuit configured to provide mechanical cooling in the mechanical cooling mode, and a cooling tower represented by the cooling tower model. The cooling tower includes a fan and a heat exchanger. In an embodiment, the chiller system further includes a cooling tower temperature sensor disposed at or near the cooling tower, the cooling tower temperature sensor configured to measure an outdoor wet bulb temperature.

In an embodiment, a method for controlling a chiller system includes receiving one or more inputs for a cooling tower model including at least one dynamic cooling tower model input, receiving one or more inputs for a heat exchanger model including at least one dynamic heat exchanger model input, and receiving one or more inputs for a pump model including at least one dynamic pump model input. The method further includes determining a cooling tower model output based on the cooling tower model and the at least one dynamic cooling tower model input, determining a heat exchanger model output based on the heat exchanger model and the at least one dynamic heat exchanger model input, and determining a pump model output based on the pump model and the at least one the pump model input. The method also includes determining an operation of the chiller system, based on the cooling tower model output, the heat exchanger model output, and the pump model output. The operation of the chiller system is a mode selected from the group consisting of a mechanical cooling mode, a free cooling mode, or an integrated free cooling mode.

In an embodiment, when the determined operation of the chiller system is a free cooling mode, the method further includes determining one or more free cooling parameters, the free cooling parameters including one or more of a condenser pump speed, a condenser pump flow rate, and a fan speed for the cooling tower.

In an embodiment, determining the one or more free cooling parameters comprises incrementally adjusting at least one of the one or more free cooling parameters to an adjusted value, determining an energy consumption at the adjusted value, and wherein the one or more free cooling parameters are determined based on the energy consumption.

In an embodiment, determining the operation of the chiller includes determining whether integrated free cooling is feasible.

In an embodiment, the determining of whether integrated free cooling is feasible includes determining a predicted heat exchanger leaving chilled water temperature when the cooling tower is operated at full capacity, comparing the predicted heat exchanger leaving chilled water temperature to a current chilled water return temperature, and determining that integrated free cooling is feasible when the predicted heat exchanger leaving chilled water temperature is lower than the current chilled water return temperature. In an embodiment, determining the predicted heat exchanger leaving chilled water temperature includes iteratively calculating the predicted heat exchanger leaving chilled water temperature and a cooling tower fluid temperature at an outlet of the heat exchanger, based on the cooling tower model and the heat exchanger model.

In an embodiment, determining the operation of the chiller includes determining whether free cooling is available. In an embodiment, the determining of whether free cooling is available includes determining a predicted heat exchanger leaving chilled water temperature that can be achieved by exchanging heat between a cooling tower circuit fluid and the chilled water and comparing the predicted heat exchanger leaving chilled water temperature to a target temperature based on cooling demand. In an embodiment, the method further includes determining, when free cooling is available, a speed for a cooling tower fan and a speed for a cooling tower circuit pump based on predicted energy consumption by the cooling tower fan and the cooling tower circuit pump. In an embodiment, the method further includes operating the cooling tower fan at the determined speed and operating the cooling tower circuit pump at the determined speed.

DRAWINGS

DETAILED DESCRIPTION

This disclosure is directed to methods and control systems for determining an operating mode for a chiller system including a cooling tower and mechanical cooling.

Figure 1:
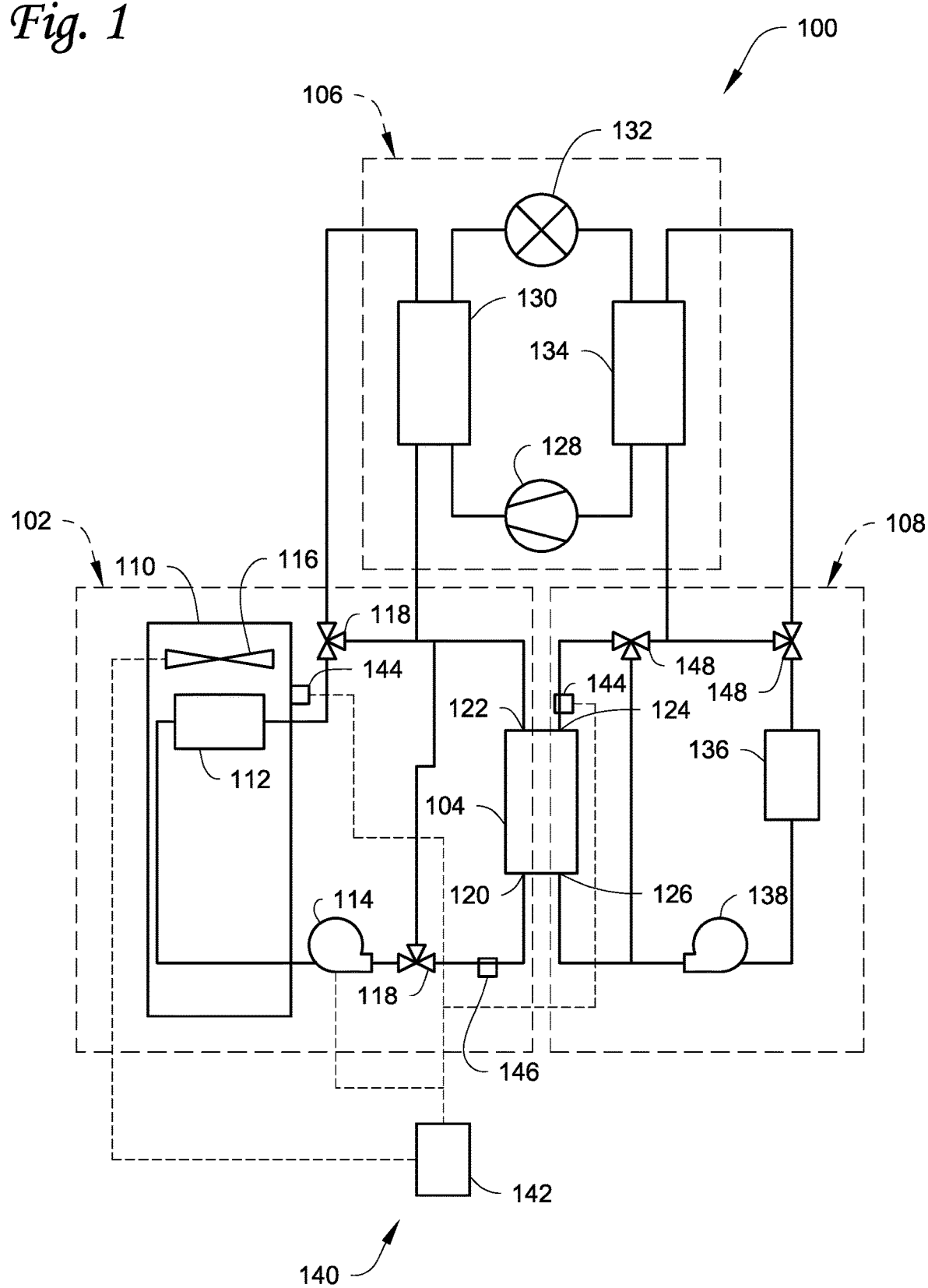
FIG. 1 shows a schematic of a chiller system including a control system according to an embodiment.

FIG. 1 shows a schematic of a chiller system including a control system according to an embodiment. Chiller system 100 includes cooling tower circuit 102, heat exchanger 104, mechanical cooling circuit 106, and cooling load circuit 108.

Cooling tower circuit 102 is a fluid circuit including a cooling tower 110 containing a cooling tower heat exchanger 112 configured to exchange heat between cooling tower process fluid and, for example, an ambient environment, and a pump 114 configured to drive the cooling tower process fluid through cooling tower circuit 102. In an embodiment, fans 116 drive air over and through cooling tower heat exchanger 112. In an embodiment, cooling tower circuit 102 can include a portion that passes through mechanical cooling circuit 106. In an embodiment, cooling tower circuit can include three-way valves 118 that, together, can allow one of mechanical cooling circuit 106 or heat exchanger 104 to be selectively bypassed. In embodiments, a series of two-way valves can be used at the position of the three-way valves, with a two-way valves following branching where the three-way valves are shown in FIG. 1, to allow mechanical cooling circuit 106 or heat exchanger 104 to be selectively bypassed. In embodiments, there may be multiple mechanical cooling circuits 106 that can each individually be bypassed or included in the cooling tower circuit 102.

Cooling tower process fluid can exchange heat with cooling load circuit process fluid in the cooling load circuit 108 at heat exchanger 104. Heat exchanger 104 can be any suitable heat exchanger for allowing for the exchange of heat between the cooling tower process fluid and the cooling load circuit process fluid. Heat exchanger 104 can include cooling tower process fluid-side inlet 120, the cooling tower process fluid-side outlet 122, the cooling load process fluid-side inlet 124, and the cooling load process-fluid side outlet 126. In an embodiment, heat exchanger 104 is a counter-flow heat exchanger. In an embodiment, heat exchanger 104 is configured such that each fluid flows in the same direction as they pass through heat exchanger 104. It is appreciated that the piping and positioning of components can be varied as necessary to achieve the counter-flow or same-direction flow of the fluids through heat exchanger 104.

Mechanical cooling circuit 106 can be any suitable cooling circuit for cooling the cooling load circuit process fluid. The mechanical cooling circuit 106 can, in an embodiment, include a compressor 128, a condenser 130, an expander 132, and an evaporator 134. The compressor 128 can be any suitable compressor for compressing a working fluid, such as a screw compressor, a scroll compressor, a centrifugal compressor, or the like. The condenser 130 can be a condenser allowing the working fluid to reject heat, for example to an ambient environment or to the cooling tower circuit 102. The expander 132 can be any suitable structure or device for expanding the working fluid leaving the condenser, such as, for example, one or more expansion valves, one or more expansion orifices, or the like. Evaporator 134 is a heat exchanger allowing the exchange of heat between the working fluid and the cooling tower circuit process fluid. Mechanical cooling circuit can be operated to cool the cooling load process fluid by absorbing heat from the cooling load process fluid at the evaporator 134 when in a mechanical cooling or integrated free cooling mode. The operation includes compressor 128 compressing a working fluid, condensing the working fluid at condenser 130 by rejecting heat to, for example, an ambient environment, expanding the condensed working fluid at expander 132, and exchanging heat at evaporator 134 such that heat is rejected by the cooling load process fluid and absorbed by the working fluid of the mechanical cooling circuit 106, thus lowering a temperature of the cooling load process fluid.

The cooling load circuit 108 is a fluid circuit configured to circulate cooling load process fluid through at least heat exchanger 104 and cooling load 136 at least during integrated free cooling and free cooling modes. In an embodiment, the cooling load 136 is a conditioned space such as for example any building for instance a commercial and/or residential space. In embodiments, the cooling load circuit 108 can bypass heat exchanger 104 during a mechanical cooling mode. Pump 138 can drive the cooling load process fluid through cooling load circuit 108. The cooling load 136 can include one or more heat exchangers where the cooling load process fluid absorbs heat, such as, for example, one or more terminal devices of a building air conditioning system. Cooling load circuit 108 can be configured such that flow of the cooling load process fluid through heat exchanger 104 is counter to the flow of the cooling tower process fluid through heat exchanger 104. Cooling load circuit 108 can further include three-way valves 148 that allow one of heat exchanger 104 or mechanical cooling circuit 106 to be selectively bypassed. In some embodiments, a series of two-way valves can be used to allow mechanical cooling circuit 106 or heat exchanger 104 to be selectively bypassed. In embodiments, there may be multiple mechanical cooling circuits 106 that can each individually be bypassed or included in the cooling load circuit 108.

Chiller system 100 can be controlled at least in part by chiller control system 140. Chiller control system 140 can include a controller 142. Optionally, sensors such as temperature sensors 144 can be included in the chiller system 100 such as at the respective inlets and/or outlets of heat exchanger 104, or positioned to measure an ambient temperature such as an outdoor wet bulb temperature at the cooling tower 110. Other sensors can include flow meters 146 included along, for example, the cooling tower circuit 102 and/or the cooling load circuit 108.

The controller 142 is a controller configured to operate chiller system 100 in a selected operating mode. The possible selected operating modes can include a free cooling mode, where the cooling load circuit 108 exchanges heat with the cooling tower circuit 102 to satisfy the cooling load 136. The possible selected operating modes can include an integrated free cooling mode, where the cooling tower circuit 102 exchanges heat with the cooling load circuit 108 and the mechanical cooling circuit 106 absorbs heat to provide further cooling to the cooling load circuit 108 to satisfy the cooling load 136. The possible selected operating modes can also include mechanical cooling where the mechanical cooling circuit 106 alone exchanges heat with cooling load circuit 108 to satisfy the cooling load 136. The controller 142 can be configured to select the operating mode from the possible operating modes based on a model of the cooling tower 110, a model of the heat exchanger 104, and/or a model of the pump 114. The controller 142 can be configured to iteratively compute each of those models to determine the selected operating mode, and optionally to select operational parameters for operation in the selected operation mode such as loading of the mechanical cooling circuit 106, or speed, power, or other such values for pump 114 and/or fans 116 in the cooling tower circuit 102.

The controller 142 can be configured to receive dynamic inputs for the models of cooling tower 110, heat exchanger 104, and/or pump 114. The dynamic inputs can be received from any suitable source, such as controls dictating the dynamic inputs, one or more sensors such as temperature sensors 144 or flow meters 146, or any other sensor(s) measuring the dynamic inputs, other controllers of the system, and the like. The dynamic inputs can be, for example, any one or more of the dynamic inputs for the models shown in FIGS. 3-5 and described below.

In an embodiment, the controller 142 can receive static inputs for one or more of the models of the cooling tower 110, the heat exchanger 104, and/or the pump 114. In an embodiment, the controller 142 can include one or more memories storing the one or more static model inputs for the models of the cooling tower 110, the heat exchanger 104, and/or the pump 114. The static inputs can be predetermined values associated with components of the chiller system 100, computed or tested values for the chiller system 100, or the like. The static inputs can be, for example, any one or more of the static inputs for the models shown in FIGS. 3-5 and described below.

The controller 142 can iteratively calculate the outputs of the models of the cooling tower 110, the heat exchanger 104, and/or the pump 114. This iterative calculation can include using previous model outputs for at least some of the dynamic inputs. The iterative calculations can continue until solutions are converged on, with the resulting solutions used by controller 142 in the determination of the operating mode for the chiller system 100.

Figure 2A:
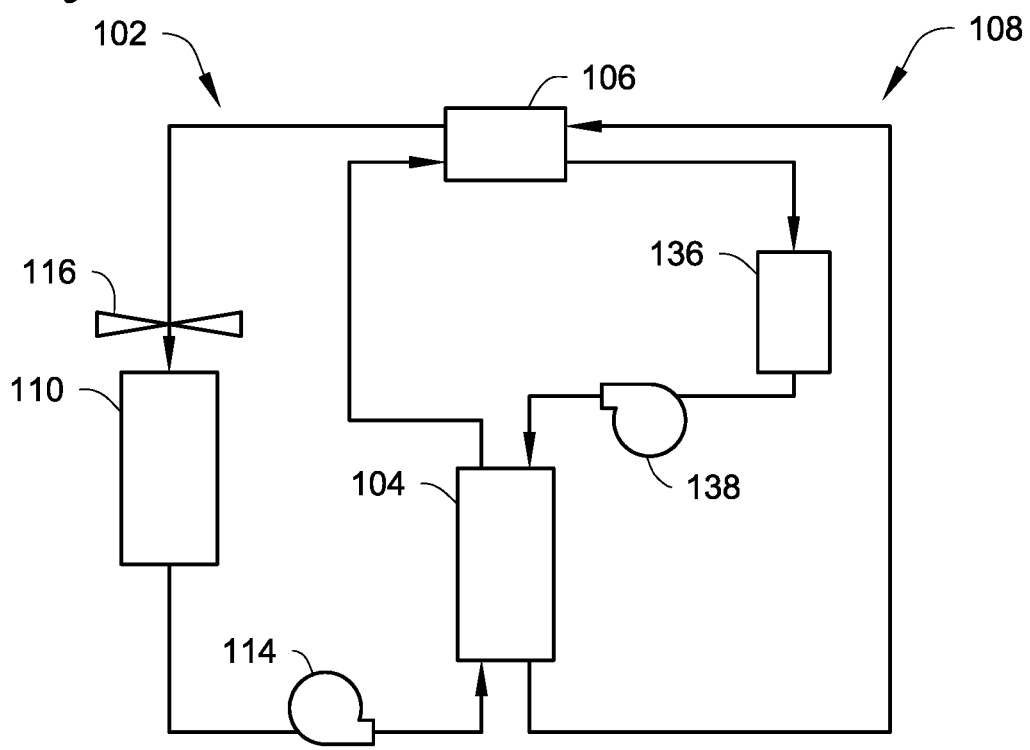
FIG. 2A shows the flow through the chiller system of FIG. 1 when in an integrated free cooling mode.

FIG. 2A shows the flow through the chiller system 100 of FIG. 1 when in an integrated free cooling mode. In the integrated free cooling mode, the cooling tower circuit 102 is in use with pump 114 and fans 116 both being in operation, and does not bypass mechanical cooling circuit 106. The mechanical cooling circuit 106 is also in operation, with compressor 128 being operated. The mechanical cooling circuit 106 can be operating at partial load, with some of the required cooling of the cooling load process fluid occurring at heat exchanger 104 by absorption of heat from the cooling load process fluid by the cooling tower process fluid. The mechanical cooling circuit 106 can be operating at a load selected to achieve a target cooling load process fluid temperature that is lower than the cooling load process fluid temperature where it leaves heat exchanger 104. In embodiments, the integrated free cooling mode may identify values for the cooling tower pump 114 operation speed or flow rate, the cooling tower fan 116 speed, and the loading of mechanical cooling circuit 106 that improve or optimize efficiency, for example by selecting a combination of those values that reduces or minimizes energy consumption. In embodiments, the flow rate through the heat exchanger 104 for the cooling load process fluid or the heat exchanger temperature set point of heat exchanger 104 can be controlled to adjust a portion of the cooling load that is satisfied by mechanical cooling circuit 106, such that the load on the mechanical cooling circuit 106 can be controlled, for example to improve or optimize characteristics of mechanical cooling circuit 106 such as the head pressure, stability of expander 132, or other efficiency or stability parameters of the mechanical cooling circuit 106.

Figure 2B:
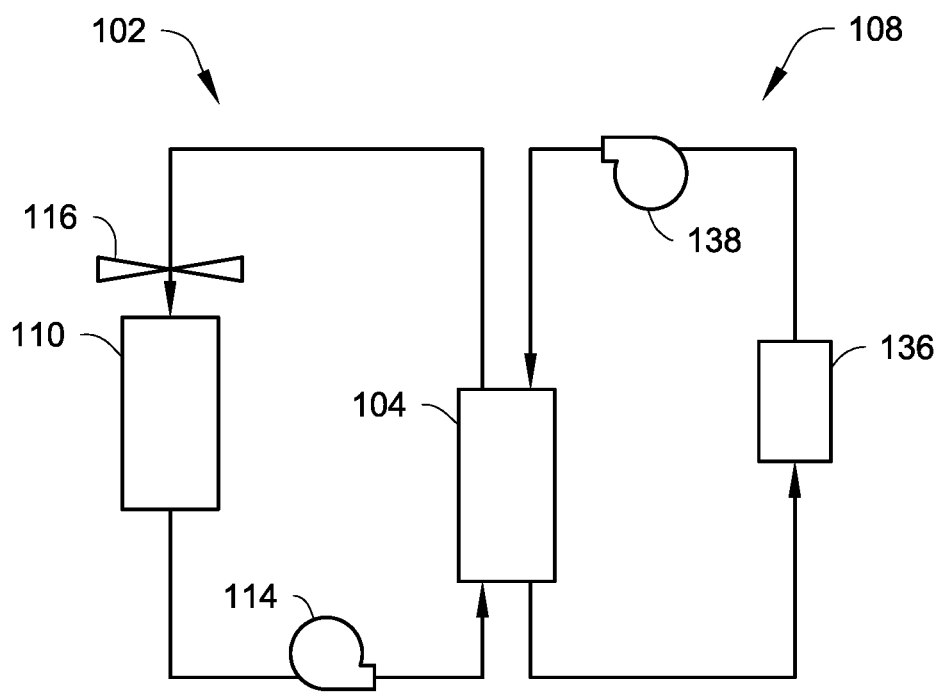
FIG. 2B shows the flow through the chiller system of FIG. 1 when in a free cooling mode.

FIG. 2B shows the flow through the chiller system 100 of FIG. 1 when in a free cooling mode. In the free cooling mode, the cooling tower circuit 102 is in use with pump 114 and fans 116 both being in operation. In an embodiment, the cooling tower circuit 102 can bypass mechanical cooling circuit 106. The mechanical cooling circuit 106 is not in operation in the free cooling mode shown in FIG. 2B. The free cooling mode shown in FIG. 2B achieves a target cooling load process fluid temperature based on the exchange of heat between the cooling tower circuit process fluid and the cooling load process fluid at heat exchanger 104. The pump 114 and fans 116 can each or both be controlled based on maintaining the target cooling load process fluid temperature. In embodiments, pump 114 and fans 116 can be operated according to selected operational parameters to reduce overall power consumption when in the free cooling mode. In some embodiments, the free cooling mode shown in FIG. 2B can be maintained when the temperature of the cooling load process fluid leaving heat exchanger 104 is within a range surrounding the target cooling load process fluid temperature, providing a range or a dead band selected to reduce the frequency of changes in operating mode. In an embodiment, when the temperature of the cooling load process fluid leaving heat exchanger 104 is above an upper end of the range or dead band, the chiller system 100 can be switched into an integrated free cooling operating mode as shown in FIG. 2A and described above, or to a mechanical cooling operating mode.

Figure 3:
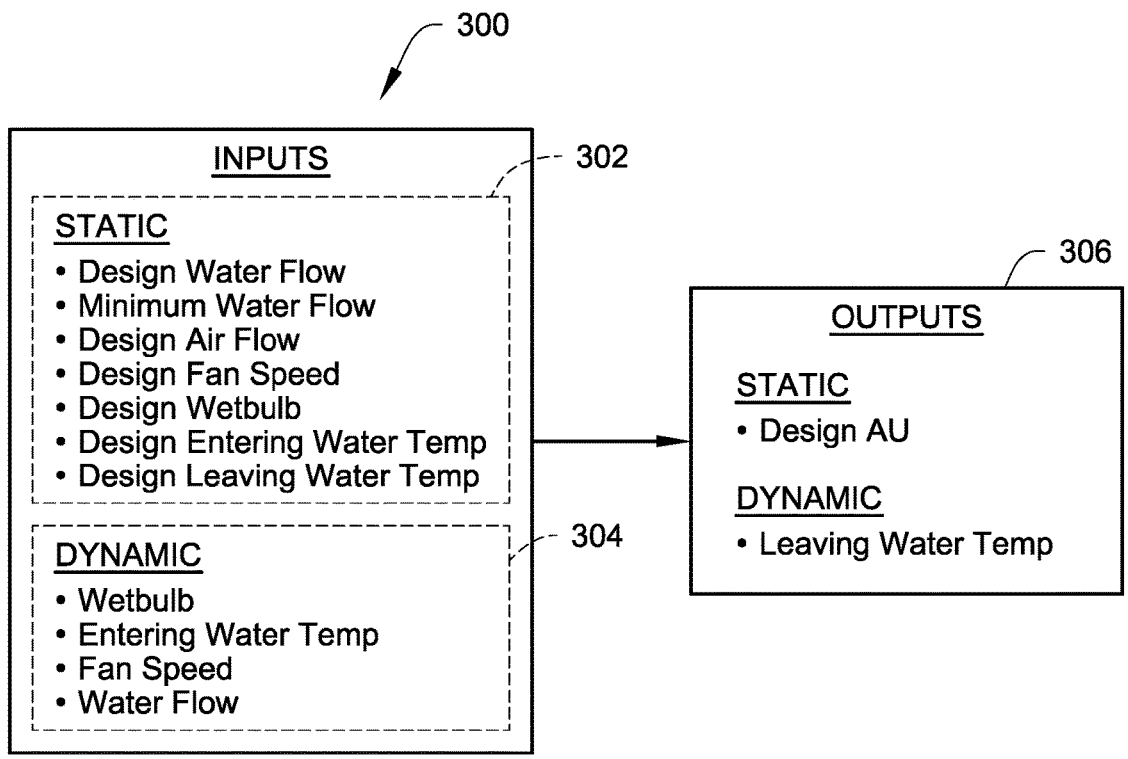
FIG. 3 shows a cooling tower model according to an embodiment.

FIG. 3 shows a cooling tower model according to an embodiment. Cooling tower model 300 is a mathematical model of a cooling tower such as cooling tower 110 described above and shown in FIG. 1. Cooling tower model 300 can be configured to receive static inputs 302 and/or dynamic inputs 304. The cooling tower model 300 produces outputs 306. The cooling tower model can be any suitable mathematical method for deriving the outputs 306 from the static inputs 302 and/or the dynamic inputs 304. In an embodiment, the cooling tower model 300 is a predetermined model of cooling tower performance, such as the cooling tower model included in ASHRAE HVAC toolkit 1.

The static inputs 302 to cooling tower model 300 can include, for example, design parameters for the cooling tower such as the design water flow for the cooling tower, the minimum flow for the cooling tower, the design air flow of the cooling tower, the design fan speed, a design temperature for the ambient environment such as an outdoor wet bulb temperature, and/or design entering and leaving temperatures for the cooling tower circuit process fluid where it enters and leaves the cooling tower heat exchanger such as cooling tower heat exchanger 112 shown in FIG. 1 and discussed above.

The dynamic inputs 304 to cooling tower model 300 can include, for example, an outdoor wet bulb or other measure of the ambient temperature around cooling tower, the actual entering temperature for cooling tower circuit process fluid, the speed of a cooling tower fan, and/or the flow rate of water through the cooling tower. The dynamic inputs 304 can be measured or derived values, for example, the entering temperature for the cooling tower circuit process fluid can be derived from output of a heat exchanger model such as heat exchanger model 400 shown in FIG. 4 and described below. The flows can be directly measured or can be derived from, for example, pump models such as pump model 500 shown in FIG. 5 and described below.

The cooling tower model 300 can produce outputs 306. The outputs 306 can include, for example, an expected leaving temperature for the cooling tower circuit process fluid leaving the cooling tower. The outputs 306 can also include derived static outputs, such as design characteristics of the cooling tower.

Figure 4:
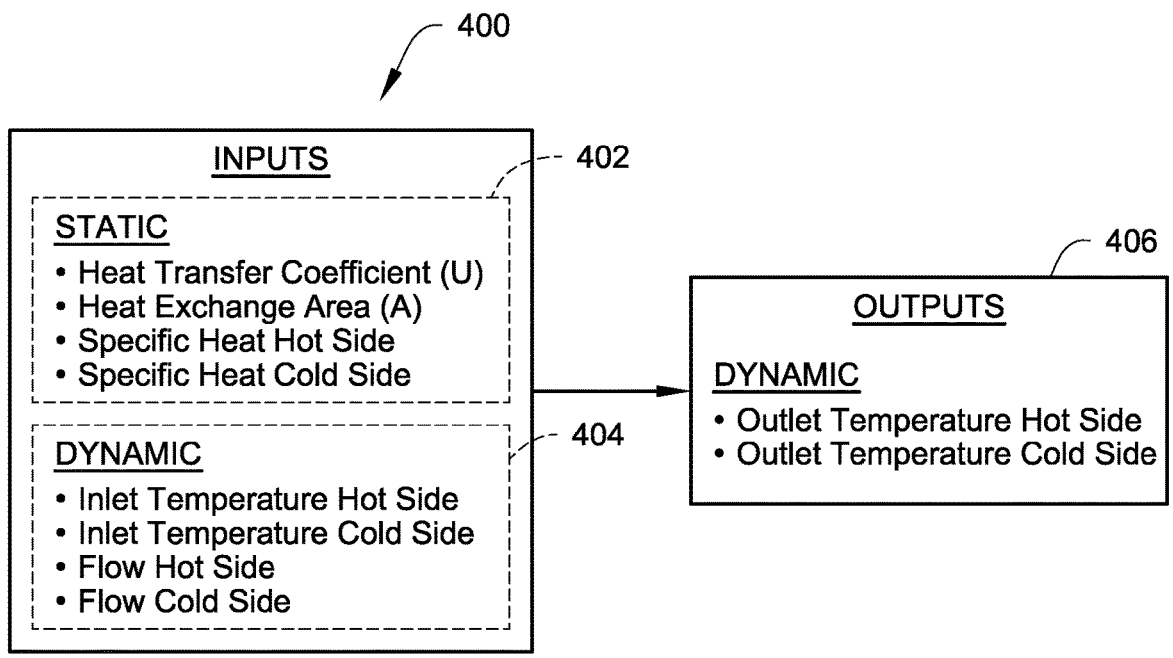
FIG. 4 shows a heat exchanger model according to an embodiment.

FIG. 4 shows a heat exchanger model according to an embodiment. Heat exchanger model 400 is a mathematical model of a heat exchanger included in a chiller system, for example heat exchanger 104 as discussed above and shown in FIG. 1. The heat exchanger model 400 can be configured to receive static inputs 402 and/or dynamic inputs 404. The heat exchanger model 400 produces outputs 406. The heat exchanger model can be any suitable mathematical method for deriving the outputs 406 from the static inputs 402 and/or the dynamic inputs 404. In an embodiment, the heat exchanger model 400 is a predetermined model of heat exchanger performance such as a thermodynamic model. In an embodiment, the heat exchanger model 400 can be an effectiveness-NTU method thermodynamic model.

The static inputs 402 to heat exchanger model 400 can include, for example, properties of the heat exchanger that is modeled such as its heat transfer coefficient, the heat exchange area provided by the heat exchanger, and/or the specific heat for it on either side, such as the cooling tower circuit process fluid side and the cooling load process fluid side.

The dynamic inputs 404 to heat exchanger model 400 can include, for example, the temperatures at the respective inlets to the heat exchanger for each of the cooling tower circuit process fluid and the cooling load process fluid, and/or the flow rates of each of the respective process fluids through the heat exchanger. The respective inlet temperatures can be measured values or derived from outputs of other models, for example, outputs from the cooling tower model 300 for the cooling tower circuit process fluid. The respective flow rates can be measured directly or derived, for example based on pump models such as pump model 500 shown in FIG. 5 and described below.

The heat exchanger model 400 can produce outputs 406. The outputs 406 can include, for example, the outlet temperatures as each of the cooling tower process fluid and the cooling load process fluid leave their respective sides of the heat exchanger.

Figure 5:
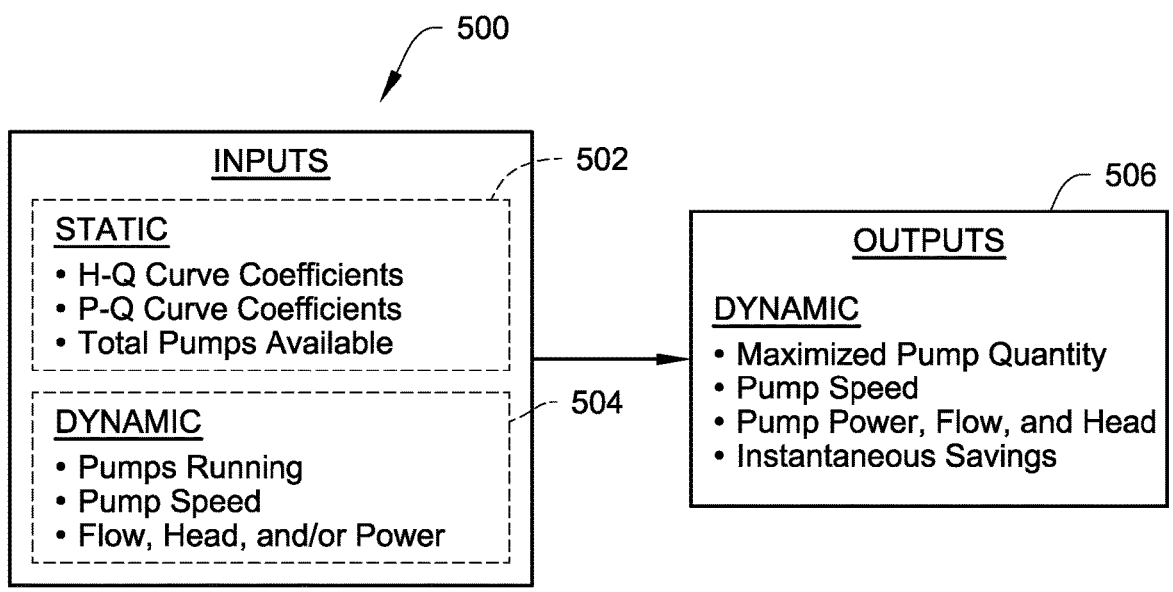
FIG. 5 shows a pump model according to an embodiment.

FIG. 5 shows a pump model according to an embodiment. Pump model 500 is a mathematical model of one or more pumps in a fluid circuit, such as, for example, pump 114 described above and shown in FIG. 1. The pump model 500 is configured to receive static inputs 502 and/or dynamic inputs 504. The pump model 500 produces outputs 506. The pump model 500 can be any suitable mathematical method for deriving the outputs 506 from the static inputs 502 and/or the dynamic inputs 504. In an embodiment, the pump model 500 is a predetermined model of pump performance, such as one or more pump curves provided as a system of equations to solve for pump curve coefficients.

The static inputs 502 to pump model 500 can include, for example, characteristics of the pump curve such as one or more curve coefficients for the pump, and/or other design parameters, such as a number of available pumps in the circuit.

The dynamic inputs 504 to cooling pump model 500 can include, for example, control of the pumps such as pump speed settings and/or a number of pumps that are running. The dynamic inputs 504 can also include flow, head, and/or power draw of the pumps being modeled. In embodiments, some of the inputs such as pump speed, flow, head, and/or power can be outputs 506 from a prior iteration of pump model 500.

The pump model 500 can produce outputs 506. The outputs 506 can include, for example, a number of pumps to operate, a speed of operation for one or more pumps, power, flow, and/or head for one or more pumps, or energy consumption and/or energy savings that can be realized from particular pump operations. Outputs 506 such as pump speed, number of pumps, and power, flow, and/or head can be fed into subsequent iterations of the pump model 500.

Figure 6:
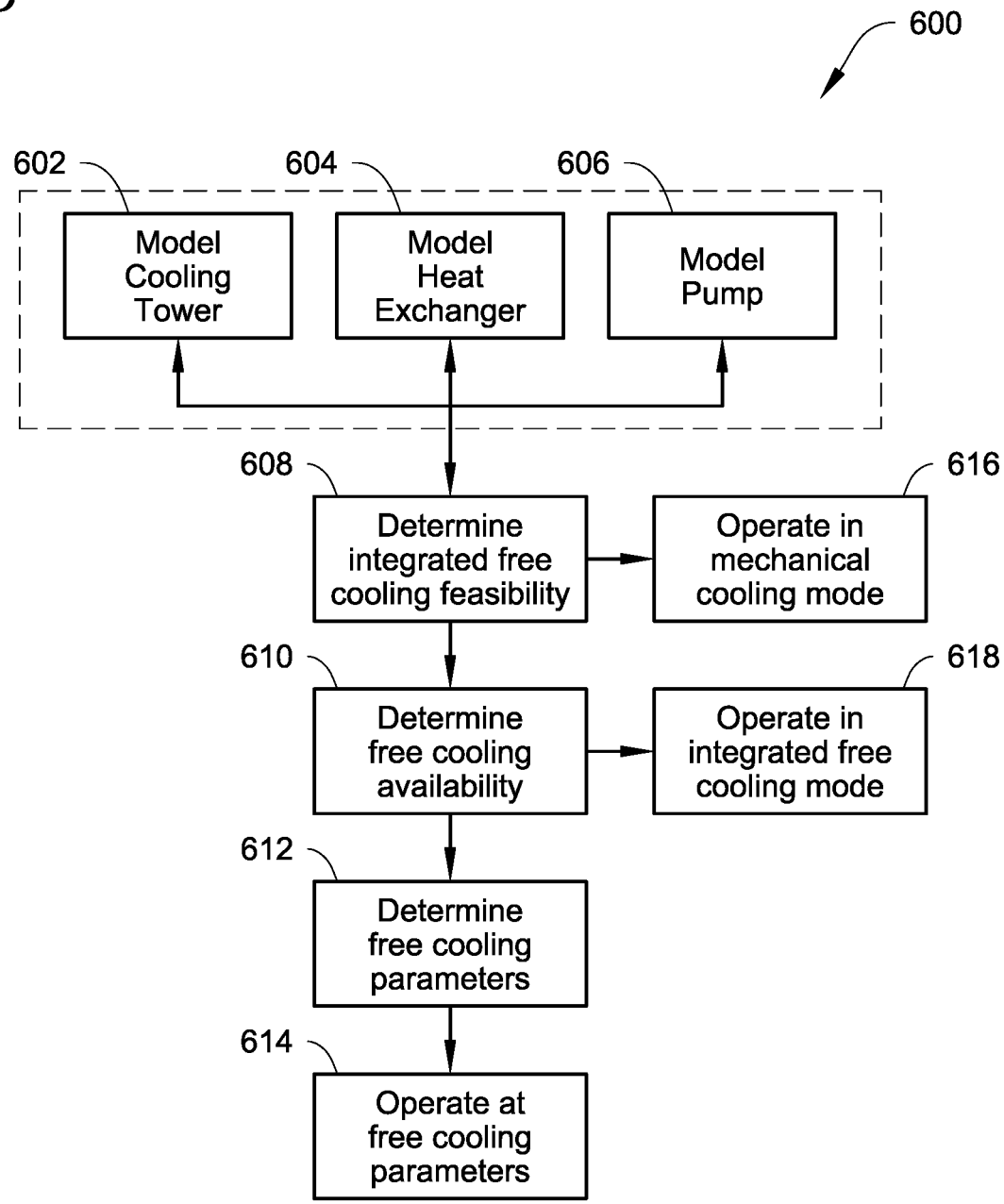
FIG. 6 shows a flowchart of a method for determining operation of a chiller system according to an embodiment.

FIG. 6 shows a flowchart of a method for determining operation of a chiller system according to an embodiment. Method 600 includes modeling a cooling tower 602, modeling a heat exchanger 604, modeling a pump 606, determining whether integrated free cooling is feasible 608, determining whether free cooling is available 610. In an embodiment, only one of determining whether integrated free cooling is feasible 608 or determining whether free cooling is available 610 may be performed during method 600. In embodiments including determining whether free cooling is available at 610, method 600 can further optionally include determining free cooling parameters 612 and operating in the free cooling mode according to the free cooling parameters 614.

A cooling tower is modeled at 602. The cooling tower can be modeled according to any suitable model of the cooling tower such as cooling tower model 300 shown in FIG. 3 and described above. The cooling tower modeling at 602 can include receiving static and/or dynamic inputs for the cooling tower model and generating outputs such as for example an expected leaving temperature for the cooling tower circuit process fluid leaving the cooling tower A heat exchanger is modeled at 604. The heat exchanger can be modeled according to any suitable model of the heat exchanger such as heat exchanger model 400 shown in FIG. 4 and described above. The heat exchanger modeling at 604 can include receiving static and/or dynamic inputs for the heat exchanger model and generating outputs such as for example the outlet temperatures as each of the cooling tower process fluid and the cooling load process fluid leave their respective sides of the heat exchanger.

A pump is modeled at 606. The pump can be modeled according to any suitable model of the pump such as pump model 500 shown in FIG. 5 and described above. The pump modeling at 606 can include receiving static and/or dynamic inputs for the cooling pump and generating outputs such as for example a number of pumps to operate, a speed of operation for one or more pumps, power, flow, and/or head for one or more pumps, or energy consumption and/or energy savings that can be realized from particular pump operations.

The modeling of the cooling tower at 602, the modeling of the heat exchanger at 604, and the modeling of the pump at 606 can each be performed and each of the modeling actions 602, 604, and 606 iterated. The iteration can be, for example, until the results converge on a solution. In an embodiment, the solution can be stable outputs from each of the cooling tower modeling 602, the heat exchanger modeling 604 and the pump modeling 606, for example when the outputs of each have been the same or within an acceptable margin from iteration to iteration. This can be performed when outputs of each model affect, or can be used as, dynamic inputs of the subsequent models, reflecting interdependence among the respective systems being modeled.

In embodiments, whether integrated free cooling is feasible is determined at 608. The determination of the feasibility of integrated free cooling can be based on whether operation of the cooling tower can help in cooling a cooling load process fluid. Some or all of the outputs of the modeling of the cooling tower at 602, the heat exchanger at 604, and the pump modeling at 606 can be used to determine a predicted heat exchanger leaving chilled water temperature. The predicted heat exchanger leaving chilled water temperature can be a solution determined by iteration of the cooling tower modeling at 602, the heat exchanger modeling 604, and/or the pump model 606. The predicted heat exchanger leaving chilled water temperature can be a predicted value for when the cooling tower modeled at 602 is being operated at its maximum capacity. The iteration can be until the predicted heat exchanger leaving chilled water temperature is converged on. The iteration can be representative of the relationships among the inputs and outputs of the respective models. Integrated free cooling can be determined to be feasible when the predicted heat exchanger leaving chilled water temperature is less than a return chilled water temperature, where cooling load process fluid enters the heat exchanger. When it is determined at 608 that integrated free cooling is not feasible, the chiller can be operated in a mechanical cooling mode at 616. In embodiments, determination of the feasibility of integrated free cooling at 608 can continue to be performed during the performance of integrated free cooling at 618, to determine whether the integrated free cooling continues to provide improved efficiency over mechanical cooling. In embodiments, continuing determination of the feasibility of integrated free cooling can include determining an energy consumption for integrated free cooling operation including cooling tower and mechanical cooling operations and comparing this value to predicted mechanical cooling energy consumption for meeting the cooling load, and stopping integrated free cooling if mechanical cooling alone would require less energy.

In embodiments, whether free cooling is available is determined at 610. The determination of free cooling availability can be based on whether operation of the cooling tower can achieve a target temperature for a cooling load process fluid. Some or all of the outputs of the modeling of the cooling tower at 602, the heat exchanger at 604, and the pump modeling at 606 can be used to determine a predicted heat exchanger leaving chilled water temperature. The predicted heat exchanger leaving chilled water temperature can be a solution determined by iteration of the cooling tower modeling at 602, the heat exchanger modeling 604, and/or the pump model 606. The predicted heat exchanger leaving chilled water temperature can be a predicted value for when the cooling tower modeled at 602 is being operated at its maximum capacity. The iteration can be until the predicted heat exchanger leaving chilled water temperature is converged on. The iteration can be representative of the relationships among the inputs and outputs of the respective models. Free cooling can be determined to be available when the predicted heat exchanger leaving chilled water temperature is at or below a target temperature for the cooling load process fluid.

When it is determined that free cooling is available at 610, method 600 can optionally include determining free cooling parameters 612. The free cooling parameters can be, for example, the respective fan and pump speeds for the cooling tower. In embodiments, fan speed and or pump speed can be determined by a "seek and find" method. The "seek and find" method can start by determining a fan speed for when the cooling tower circuit process fluid is being provided at a flow that is at or about double the flow of the cooling load process fluid. From this start point, the fan speed can be incremented or decremented by a predetermined value, for example at or about 0.5%, and the required flow and resulting fan and pump power consumptions can be determined. It will be appreciated that the predetermined value of incrementation or decrementation can vary to be higher or lower than 0.5%. This can be iterated, and the most efficient combination of fan speed and pump speed in the cooling tower for the particular target temperature for the cooling load process fluid (i.e. the combination having the lowest total power consumption by fan and pump). Pump power consumption can be determined based, for example, on pump parameters such as static lift, system head based on the operation of the pump, and using affinity laws to predict power consumption at another speed and head value. Fan power consumption can be based, for example, on a cubic function relating fan speed and power such as in the fan laws. The fan and pump can then be operated at their respective determined speeds while operating in the free cooling mode at 614. Operation in the free cooling mode can be continued within a dead band or range of acceptable temperatures for the cooling load process fluid to limit the frequency of switching from free cooling to other operating modes such as integrated free cooling or mechanical cooling modes.

When it is determined at 610 that free cooling is not available, but it was determined at 608 that integrated free cooling was feasible, the chiller system can be operated in the integrated free cooling mode at 618.

Aspects:

It is understood that any of aspects 1-10 can be combined with any of aspects 11-20.

Aspect 1. A chiller control system, comprising a controller configured to:

receive one or more inputs for a cooling tower model including at least one dynamic cooling tower model input;

receive one or more inputs for a heat exchanger model including at least one dynamic heat exchanger model input;

receive one or more inputs for a pump model including at least one dynamic pump model input;

determine a cooling tower model output based on the cooling tower model and the at least one dynamic cooling tower model input;

determine a heat exchanger model output based on the heat exchanger model and the at least one dynamic heat exchanger model input;

determine a pump model output based on the pump model and the at least one the pump model input;

determine an operation of a chiller system, based on the cooling tower model output, the heat exchanger model output, and the pump model output, wherein the operation of the chiller system is a mode selected from the group consisting of a mechanical cooling mode, a free cooling mode, or an integrated free cooling mode; and operate the chiller system in the determined operation.

Aspect 2. The chiller control system according to aspect 1, further comprising a cooling tower temperature sensor configured to measure an outdoor wet bulb temperature and one or more heat exchanger temperature sensors, each of the one or more heat exchanger temperature sensors being located an inlet or an outlet of a heat exchanger represented by the heat exchanger model.

Aspect 3. The chiller control system according to any of aspects 1-2, wherein the controller is further configured to, when the operation of the chiller system is a free cooling mode, determine one or more free cooling parameters, the free cooling parameters including one or more of a condenser pump speed, a condenser pump flow rate, and a fan speed for the cooling tower.

Aspect 4. The chiller control system according to aspect 3, wherein the determination of the one or more free cooling parameters comprises incrementally adjusting at least one of the one or more free cooling parameters to an adjusted value, determining an energy consumption at the adjusted value, and wherein the one or more free cooling parameters are determined based on the energy consumption.

Aspect 5. The chiller control system according to any of aspects 1-4, wherein the controller is configured to determine whether cooling is feasible, wherein the determining of whether integrated free cooling is feasible comprises:

determining a predicted heat exchanger leaving chilled water temperature if the cooling tower is operated at full capacity;

comparing the predicted heat exchanger leaving chilled water temperature to a current chilled water return temperature;

determining that integrated free cooling is feasible when the predicted heat exchanger leaving chilled water temperature is lower than the current chilled water return temperature.

Aspect 6. The chiller control system according to aspect 5, wherein determining the predicted heat exchanger leaving chilled water temperature includes iteratively calculating the predicted heat exchanger leaving chilled water temperature and a cooling tower fluid temperature at an outlet of the heat exchanger, based on the cooling tower model and the heat exchanger model.

Aspect 7. The chiller control system according to any of aspects 1-6, wherein the controller is configured to determine whether free cooling is available, and the determining of whether free cooling is available comprises determining a predicted heat exchanger leaving chilled water temperature that can be achieved by exchanging heat between a cooling tower circuit fluid and the chilled water, and comparing the predicted heat exchanger leaving chilled water temperature to a target temperature based on cooling demand.

Aspect 8. The chiller control system according to aspect 7, wherein the controller is configured to determine, when free cooling is available, a speed for a cooling tower fan and a speed for a cooling tower circuit pump based on predicted energy consumption by the cooling tower fan and the cooling tower circuit pump.

Aspect 9. A chiller system, comprising the chiller control system according to any of aspects 1-8, a refrigeration circuit configured to provide mechanical cooling in the mechanical cooling mode, and a cooling tower represented by the cooling tower model, wherein the cooling tower includes a fan and a heat exchanger.

Aspect 10. The chiller system according to aspect 9, further comprising a cooling tower temperature sensor disposed at or near the cooling tower, the cooling tower temperature sensor configured to measure an outdoor wet bulb temperature.

Aspect 11. A method for controlling a chiller system, comprising:

receiving one or more inputs for a cooling tower model including at least one dynamic cooling tower model input;

receiving one or more inputs for a heat exchanger model including at least one dynamic heat exchanger model input;

receiving one or more inputs for a pump model including at least one dynamic pump model input;

determining a cooling tower model output based on the cooling tower model and the at least one dynamic cooling tower model input;

determining a heat exchanger model output based on the heat exchanger model and the at least one dynamic heat exchanger model input;

determining a pump model output based on the pump model and the at least one the pump model input;

determining an operation of the chiller system, based on the cooling tower model output, the heat exchanger model output, and the pump model output, wherein the operation of the chiller system is a mode selected from the group consisting of a mechanical cooling mode, a free cooling mode, or an integrated free cooling mode.

Aspect 12. The method according to aspect 11, wherein when the determined operation of the chiller system is a free cooling mode, the method further includes determining one or more free cooling parameters, the free cooling parameters including one or more of a condenser pump speed, a condenser pump flow rate, and a fan speed for the cooling tower.

Aspect 13. The method according to aspect 12, wherein determining the one or more free cooling parameters comprises incrementally adjusting at least one of the one or more free cooling parameters to an adjusted value, determining an energy consumption at the adjusted value, and wherein the one or more free cooling parameters are determined based on the energy consumption.

Aspect 14. The method according to any of aspects 12-13, wherein determining the operation of the chiller includes determining whether integrated free cooling is feasible.

Aspect 15. The method according to aspect 14, wherein the determining of whether integrated free cooling is feasible comprises:

determining a predicted heat exchanger leaving chilled water temperature if the cooling tower is operated at full capacity;

comparing the predicted heat exchanger leaving chilled water temperature to a current chilled water return temperature;

determining that integrated free cooling is feasible when the predicted heat exchanger leaving chilled water temperature is lower than the current chilled water return temperature.

Aspect 16. The method according to aspect 15, wherein determining the predicted heat exchanger leaving chilled water temperature includes iteratively calculating the predicted heat exchanger leaving chilled water temperature and a cooling tower fluid temperature at an outlet of the heat exchanger, based on the cooling tower model and the heat exchanger model.

Aspect 17. The method according to any of aspects 12-16, wherein determining the operation of the chiller includes determining whether free cooling is available.

Aspect 18. The method according to aspect 17, wherein the determining of whether free cooling is available comprises:

determining a predicted heat exchanger leaving chilled water temperature that can be achieved by exchanging heat between a cooling tower circuit fluid and chilled water, and comparing the predicted heat exchanger leaving chilled water temperature to a target temperature based on cooling demand.

Aspect 19. The method according to aspect 18, further comprising determining, when free cooling is available, a speed for a cooling tower fan and a speed for a cooling tower circuit pump based on predicted energy consumption by the cooling tower fan and the cooling tower circuit pump.

Aspect 20. The method according to aspect 19, further comprising operating the cooling tower fan at the determined speed and operating the cooling tower circuit pump at the determined speed.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A chiller control system, comprising a controller configured to:

receive one or more inputs for a cooling tower model including at least one dynamic cooling tower model input;

receive one or more inputs for a heat exchanger model including at least one dynamic heat exchanger model input;

receive one or more inputs for a pump model including at least one dynamic pump model input;

determine a cooling tower model output based on the cooling tower model and the at least one dynamic cooling tower model input;

determine a heat exchanger model output based on the heat exchanger model and the at least one dynamic heat exchanger model input;

determine a pump model output based on the pump model and the at least one the pump model input;

determine an operation of a chiller system, based on an ability to cool a process fluid to a target temperature, the ability to cool the process fluid determined using the cooling tower model output, the heat exchanger model output, and the pump model output, wherein the operation of the chiller system is a mode selected from a group consisting of a mechanical cooling mode, a free cooling mode, or an integrated free cooling mode; and operate the chiller system in the determined operation.

2. The chiller control system of claim 1, further comprising a cooling tower temperature sensor configured to measure an outdoor wet bulb temperature and one or more heat exchanger temperature sensors, each of the one or more heat exchanger temperature sensors being located at an inlet or an outlet of a heat exchanger represented by the heat exchanger model.

3. The chiller control system of claim 1, wherein the controller is further configured to, when the operation of the chiller system is a free cooling mode, determine one or more free cooling parameters, the one or more free cooling parameters including one or more of a condenser pump speed, a condenser pump flow rate, and a fan speed for the cooling tower.

4. The chiller control system of claim 3, wherein the determination of the one or more free cooling parameters comprises incrementally adjusting at least one of the one or more free cooling parameters to an adjusted value, determining an energy consumption at the adjusted value, and wherein the one or more free cooling parameters are determined based on the energy consumption.

5. The chiller control system of claim 1, wherein the controller is configured to determine whether integrated free cooling is feasible, wherein the determining of whether integrated free cooling is feasible comprises:

determining a predicted heat exchanger leaving process fluid temperature if the cooling tower is operated at full capacity;

comparing the predicted heat exchanger leaving process fluid temperature to a current process fluid return temperature;

determining that integrated free cooling is feasible when the predicted heat exchanger leaving process fluid temperature is lower than the current process fluid return temperature.

6. The chiller control system of claim 5, wherein determining the predicted heat exchanger leaving process fluid temperature includes iteratively calculating the predicted heat exchanger leaving process fluid temperature and a cooling tower fluid temperature at an outlet of the heat exchanger, based on the cooling tower model and the heat exchanger model.

7. The chiller control system of claim 1, wherein the controller is configured to determine whether free cooling is available, and the determining of whether free cooling is available comprises determining a predicted heat exchanger leaving process fluid temperature that can be achieved by exchanging heat between a cooling tower circuit fluid and the process fluid, and comparing the predicted heat exchanger leaving process fluid temperature to a target temperature based on cooling demand.

8. The chiller control system of claim 7, wherein the controller is configured to determine, when free cooling is available, a speed for a cooling tower fan and a speed for a cooling tower circuit pump based on predicted energy consumption by the cooling tower fan and the cooling tower circuit pump.

9. A chiller system, comprising the chiller control system of claim 1, a refrigeration circuit configured to provide mechanical cooling in the mechanical cooling mode, and a cooling tower represented by the cooling tower model, wherein the cooling tower includes a fan and a heat exchanger.

10. The chiller system according to claim 9, further comprising a cooling tower temperature sensor disposed at the cooling tower, the cooling tower temperature sensor configured to measure an outdoor wet bulb temperature.

11. A method for controlling a chiller system, comprising:
receiving one or more inputs for a cooling tower model including at least one dynamic cooling tower model input;
receiving one or more inputs for a heat exchanger model including at least one dynamic heat exchanger model input;
receiving one or more inputs for a pump model including at least one dynamic pump model input;
determining a cooling tower model output based on the cooling tower model and the at least one dynamic cooling tower model input;
determining a heat exchanger model output based on the heat exchanger model and the at least one dynamic heat exchanger model input;
determining a pump model output based on the pump model and the at least one dynamic pump model input;
determining an operation of the chiller system, based on an ability to cool a process fluid to a target temperature, the ability to cool the process fluid determined using the cooling tower model output, the heat exchanger model output, and the pump model output, wherein the operation of the chiller system is a mode selected from a group consisting of a mechanical cooling mode, a free cooling mode, or an integrated free cooling mode.

12. The method of claim 11, wherein when the determined operation of the chiller system is a free cooling mode, the method further includes determining one or more free cooling parameters, the one or more free cooling parameters including one or more of a condenser pump speed, a condenser pump flow rate, and a fan speed for the cooling tower.

13. The method of claim 12, wherein determining the one or more free cooling parameters comprises incrementally adjusting at least one of the one or more free cooling parameters to an adjusted value, determining an energy consumption at the adjusted value, and wherein the one or more free cooling parameters are determined based on the energy consumption.

14. The method of claim 12, wherein determining the operation of the chiller includes determining whether integrated free cooling is feasible.

15. The method of claim 14, wherein the determining of whether integrated free cooling is feasible comprises:
determining a predicted heat exchanger leaving process fluid temperature if the cooling tower is operated at full capacity;
comparing the predicted heat exchanger leaving process fluid temperature to a current process fluid return temperature;
determining that integrated free cooling is feasible when the predicted heat exchanger leaving process fluid temperature is lower than the current process fluid return temperature.

16. The method of claim 15, wherein determining the predicted heat exchanger leaving process fluid temperature includes iteratively calculating the predicted heat exchanger leaving process fluid temperature and a cooling tower fluid temperature at an outlet of the heat exchanger, based on the cooling tower model and the heat exchanger model.

17. The method of claim 12, wherein determining the operation of the chiller system includes determining whether free cooling is available.

18. The method of claim 17, wherein the determining of whether free cooling is available comprises:
determining a predicted heat exchanger leaving process fluid temperature that can be achieved by exchanging heat between a cooling tower circuit fluid and process fluid, and
comparing the predicted heat exchanger leaving process fluid temperature to a target temperature based on cooling demand.

19. The method of claim 18, further comprising determining, when free cooling is available, a speed for a cooling tower fan and a speed for a cooling tower circuit pump based on predicted energy consumption by the cooling tower fan and the cooling tower circuit pump.

20. The method of claim 19, further comprising operating the cooling tower fan at the determined speed and operating the cooling tower circuit pump at the determined speed.

* * * * *